United States Patent
Li et al.

(10) Patent No.: US 12,063,258 B2
(45) Date of Patent: Aug. 13, 2024

(54) VOICE SERVICE ROUTING SYSTEM FOR ACCESSIBILITY

(71) Applicant: Comcast Cable Communications, LLC, Philadelphia, PA (US)

(72) Inventors: Chia-Chang Li, Holmdel, NJ (US); Eric Wong, Edison, NJ (US); Satish Sampangiramiah, Highlands Ranch, CO (US); Robert Lambardia, Castle Rock, CO (US); Amarendar Sirikonda, Princeton, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/172,581

(22) Filed: Jun. 3, 2016

(65) Prior Publication Data

US 2017/0353608 A1 Dec. 7, 2017

(51) Int. Cl.
*H04M 3/00* (2024.01)
*H04L 12/66* (2006.01)
*H04L 65/1104* (2022.01)
*H04L 101/65* (2022.01)
*H04M 3/42* (2006.01)
*H04M 3/51* (2006.01)
*H04M 3/523* (2006.01)
*H04M 5/00* (2006.01)

(52) U.S. Cl.
CPC ..... *H04L 65/1104* (2022.05); *H04M 3/42068* (2013.01); *H04M 3/51* (2013.01); *H04M 3/523* (2013.01); *H04L 2101/65* (2022.05); *H04M 2203/158* (2013.01); *H04M 2203/408* (2013.01)

(58) Field of Classification Search
CPC .. H04M 15/00; H04M 3/42314; H04M 15/63; H04M 7/006; H04M 15/57; H04M 2215/208; H04M 3/42102; H04M 7/0075; H04M 15/80; H04M 15/56; H04M 15/8044; H04M 15/8022; H04M 15/81; H04M 15/41; H04M 15/50; H04M 15/8055; H04L 65/1069; H04L 65/1016; H04L 12/66; H04L 65/1006; H04L 65/1033; H04L 12/14
USPC .................... 379/220.01, 142.1, 52; 370/352
See application file for complete search history.

(56) References Cited

U.S. PATENT DOCUMENTS

| | | | | |
|---|---|---|---|---|
| 5,875,240 A | * | 2/1999 | Silverman | H04M 3/46 379/133 |
| 6,961,334 B1 | * | 11/2005 | Kaczmarczyk | H04M 3/38 370/354 |
| 7,123,706 B2 | * | 10/2006 | Ooki | H04M 3/54 379/211.02 |
| 7,487,199 B2 | | 2/2009 | Idnani | |
| 7,660,398 B2 | | 2/2010 | Engelke et al. | |
| 7,978,827 B1 | * | 7/2011 | Becker | H04M 3/42391 379/52 |

(Continued)

*Primary Examiner* — Kharye Pope
(74) *Attorney, Agent, or Firm* — BakerHostetler (57) ABSTRACT

Systems and methods for managing network communication are disclosed. Methods and systems can comprise receiving a telephony message having a source address and determining routing information using the source address. A telephony call may be routed using the determined routing information. Such processing may be implemented to route telephony calls to certain services such as accessibility services based on at least the source address of a telephony message.

20 Claims, 7 Drawing Sheets

(56) References Cited

U.S. PATENT DOCUMENTS

| | | | |
|---|---|---|---|
| 8,516,126 B2 | 8/2013 | Gao et al. | |
| 8,638,676 B2 | 1/2014 | George et al. | |
| 9,705,993 B1* | 7/2017 | Asghari | H04M 3/4933 |
| 2003/0165226 A1* | 9/2003 | Vu | H04Q 3/66 |
| | | | 379/221.01 |
| 2004/0032937 A1* | 2/2004 | Brady | H04M 15/00 |
| | | | 379/115.03 |
| 2004/0151298 A1* | 8/2004 | Plunkett | H04M 3/2218 |
| | | | 379/220.01 |
| 2005/0129185 A1* | 6/2005 | McClelland | H04M 3/42391 |
| | | | 379/52 |
| 2005/0201529 A1* | 9/2005 | Nelson | H04M 3/5116 |
| | | | 379/45 |
| 2005/0232169 A1* | 10/2005 | McLaughlin | H04Q 3/04 |
| | | | 370/261 |
| 2006/0128357 A1* | 6/2006 | Suryanarayana | H04M 3/42068 |
| | | | 455/404.2 |
| 2006/0140382 A1* | 6/2006 | Huey | H04M 3/42 |
| | | | 379/220.01 |
| 2006/0256948 A1* | 11/2006 | Crockett | H04Q 3/0029 |
| | | | 379/220.01 |
| 2006/0285652 A1* | 12/2006 | McClelland | H04M 3/42391 |
| | | | 379/52 |
| 2007/0047529 A1* | 3/2007 | Ricciardi | H04L 9/40 |
| | | | 370/356 |
| 2007/0203736 A1* | 8/2007 | Ashton | G06Q 10/02 |
| | | | 705/5 |
| 2007/0232279 A1* | 10/2007 | Sjogren | H04M 3/4931 |
| | | | 455/414.1 |
| 2007/0242660 A1* | 10/2007 | Xu | H04M 7/006 |
| | | | 370/352 |
| 2008/0091612 A1* | 4/2008 | Witecha | H04M 3/44 |
| | | | 705/53 |
| 2008/0101581 A1* | 5/2008 | Pearson | H04M 3/4931 |
| | | | 379/218.01 |
| 2008/0123640 A1 | 5/2008 | Bhatia et al. | |
| 2008/0165706 A1* | 7/2008 | Bozionek | H04M 7/006 |
| | | | 370/259 |
| 2008/0176582 A1* | 7/2008 | Ghai | H04L 65/102 |
| | | | 455/456.2 |
| 2009/0063474 A1* | 3/2009 | Curry | G06Q 10/107 |
| 2010/0166155 A1* | 7/2010 | Charugundla | H04M 3/42391 |
| | | | 379/52 |
| 2010/0172345 A1* | 7/2010 | Bjorsell | H04M 7/006 |
| | | | 370/352 |
| 2010/0226362 A1* | 9/2010 | Kim | H04L 12/14 |
| | | | 370/352 |
| 2010/0322391 A1* | 12/2010 | Michaelis | H04M 3/42391 |
| | | | 379/45 |
| 2011/0134913 A1 | 6/2011 | Astrom et al. | |
| 2011/0176666 A1* | 7/2011 | Reding | H04M 3/42161 |
| | | | 379/93.01 |
| 2011/0177797 A1* | 7/2011 | Vendrow | H04M 3/4234 |
| | | | 455/414.1 |
| 2012/0033800 A1* | 2/2012 | Czachor, Jr. | H04M 3/51 |
| | | | 379/214.01 |
| 2013/0022188 A1* | 1/2013 | Padmanabhan | H04M 3/4931 |
| | | | 379/201.08 |
| 2014/0161241 A1* | 6/2014 | Baranovsky | H04M 3/51 |
| | | | 379/142.05 |
| 2014/0267579 A1* | 9/2014 | Montero | H04L 12/1827 |
| | | | 348/14.11 |
| 2015/0022616 A1* | 1/2015 | Talbot | H04N 7/147 |
| | | | 348/14.01 |
| 2015/0195695 A1* | 7/2015 | Geiger | H04M 1/57 |
| | | | 455/414.1 |
| 2015/0341486 A1* | 11/2015 | Knighton | H04W 4/16 |
| | | | 455/414.1 |
| 2015/0381666 A1* | 12/2015 | Rustogi | H04L 65/1006 |
| | | | 370/352 |
| 2016/0072955 A1* | 3/2016 | Barkan | H04M 3/42212 |
| 2016/0277572 A1* | 9/2016 | Benich | H04L 65/1046 |
| 2016/0277587 A1* | 9/2016 | Alexander | H04L 65/1006 |

\* cited by examiner

VOICE SERVICE ROUTING SYSTEM FOR ACCESSIBILITY

BACKGROUND

Current telephony systems allow for the routing of calls based on a call type (e.g., local call, toll call, long distance call, international call, etc.). In such systems, the service provider may use the call number and/or call type to determine the destination of the call and then cause the call to be routed. This may be sufficient for general routing of calls that originate from the service provider's users (e.g., users, customers, subscribers, etc.). However, merely using the call type may be insufficient to manage special routing procedures for particular users or circumstances.

As an example, accessibility users may need a mechanism to access telephony services to connect with a desired destination with as little physical requirement as possible. Typically, a user may dial "0" for operator services. However, typical operator services require additional digit dialing and/or interactive voice response (IVR) communication. These and other shortcomings are addressed by the present disclosure.

SUMMARY

The present disclosure employs a combination of the capabilities in a routing engine and a routing database placed in a key network location, where messages of all call types/services traverse, to direct calls such as calls from accessibility customers to special destinations that require assistance services (e.g., operator services) or other additional services. In certain aspects, a routing engine determines the type of calls that need special treatment. For example, a routing engine can query a routing database with a received calling number, for example, through electronic number mapping (ENUM) or session initiation protocol (SIP) redirect protocols, SIP invite from or P-asserted identity (PAID) headers, etc. As such, for accessibility customer calling numbers, the invite message R-URI may be replaced with a special destination number, which will connect with services such as live operators through designated peering points with the operator services provider.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
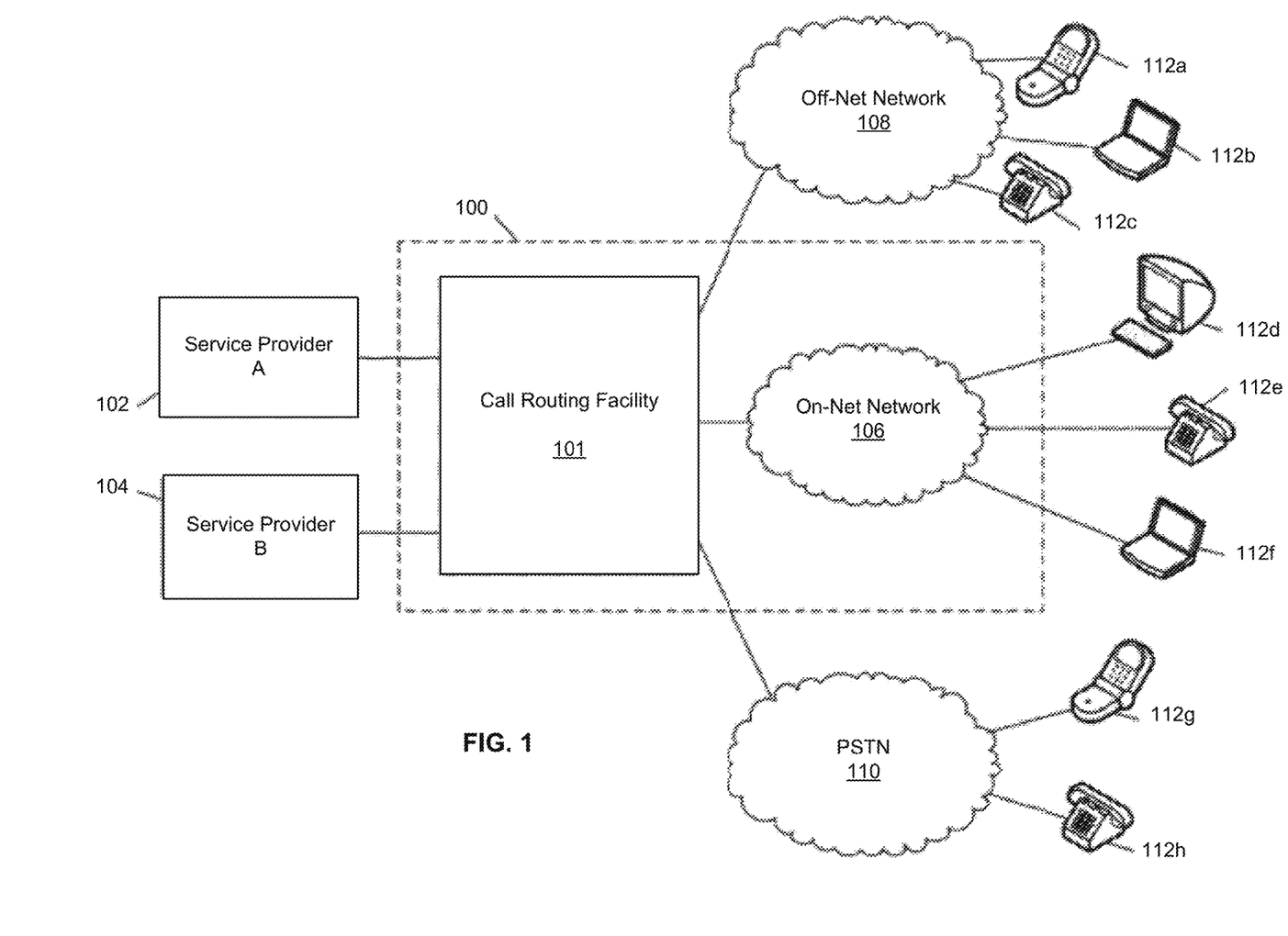
FIG. 1 is a block diagram of an example system and network.

FIG. 1 illustrates various aspects of an exemplary network in which the present methods and systems can operate. The present disclosure is related to systems and methods for managing a network, for example. Those skilled in the art will appreciate that present methods may be used in various types of networks and systems that employ both digital and analog equipment. The system is described as comprised of elements. An element can be software, hardware, or a combination of software and hardware. One skilled in the art will appreciate that provided herein is a functional description and that the respective functions can be performed by software, hardware, or a combination of software and hardware.

FIG. 1 illustrates an example network though which calls may be routed. The network may include multiple portions including, for example, a public switched telephone network (PSTN) 110, an off-net network 108, and an on-net network 106. On-net and off-net networks may be any type of network such as a digital network, coaxial cable networks, optical fiber networks, hybrid fiber/coax networks (HFC), cellular telephone wireless networks, local wireless networks (e.g., WiMAX), satellite networks, etc. The networks 110, 108 and 106 may be dedicated telephone or voice communication networks, or networks also carrying other data and content, such as video signals, packetized data, and/or Internet Protocol (IP) data.

In one or more arrangements, the networks 108 and 106 may distribute digitized voice communication over communication lines of the respective network. In one or more configurations, the networks 108 and 106 might only be accessible by users of a service provider 100 (e.g., users, subscribers, and/or customers of the service provider 100); however, the network may be accessible by non-subscribing users. For example, the network illustrated in FIG. 1 may route calls, via the networks 110, 108 and/or 106, or any combination thereof, to one or more communication devices (e.g., communication devices 112 of the networks 110, 108 and 106, such as a personal computer (PC) 112*d*, laptop computer 112*b* and 112*f*; mobile communication device 112*a* and 112*g*; and telecommunication devices 112*c*, 112*e* and 112*h*) using a call routing facility 101. Generally, communications devices can include, for example, a television, a set-top box (STB), a digital video recorder (DVR), a computer server, a personal computer, laptop computer, tablet computer, wireless devices (wireless laptops and netbooks, mobile phones, mobile televisions, personal digital assistants (PDA), etc.), a stationary telephone (e.g., wired or hard-wired telephone), and any other desired device.

In one or more arrangements, the on-net network 106 may be a network operated by the service provider 100. For example, the on-net network 106 may use a series of interconnected communication lines (e.g., coaxial cables, optical fibers, wireless, etc.) to connect multiple user devices to a central office of the service provider 100. The central office of the service provider 100 may transmit downstream information signals onto the lines of the network 106, and each home may have a receiver used to receive and process those signals. There may be one or more lines originating from the central office of the service provider 100, and each may be split a number of times to distribute the signal from the central office. The network 106 may include components not illustrated, such as splitters, filters, amplifiers, etc. to help convey the signal clearly.

Additionally, in some arrangements, the off-net network 108 may be a network operated by another service provider 108 (e.g., a third-party service provider, such as a third-party wholesale carrier, a third-party telephony carrier, etc.); however, generally, the off-net network 108 may not be under the control of the service provider 100. The off-net network 108 may include components that are the same as or similar to the on-net network 106.

In one or more embodiments, the calls to be routed via the call routing facility 101 may originate from another source, such as another service provider (e.g., service provider A 102, service provider B 104, etc.) Generally, another service provider can be a wholesale carrier, telephony carrier, voice-over Internet Protocol (VoIP) carrier, etc. Additionally, the service provider A 102 and the service provider B 104 may provide different services from each other. For example, the service provider A 102 may be a wholesale VoIP carrier, while service provider B may be an international voice carrier. Each service provider may have established an arrangement or agreement with the service provider 100 which specifies one or more rules for handling, routing, and/or processing calls that originate from the another service provider (e.g., the service provider A 102, the service provider B 104, etc.).

Figure 2:
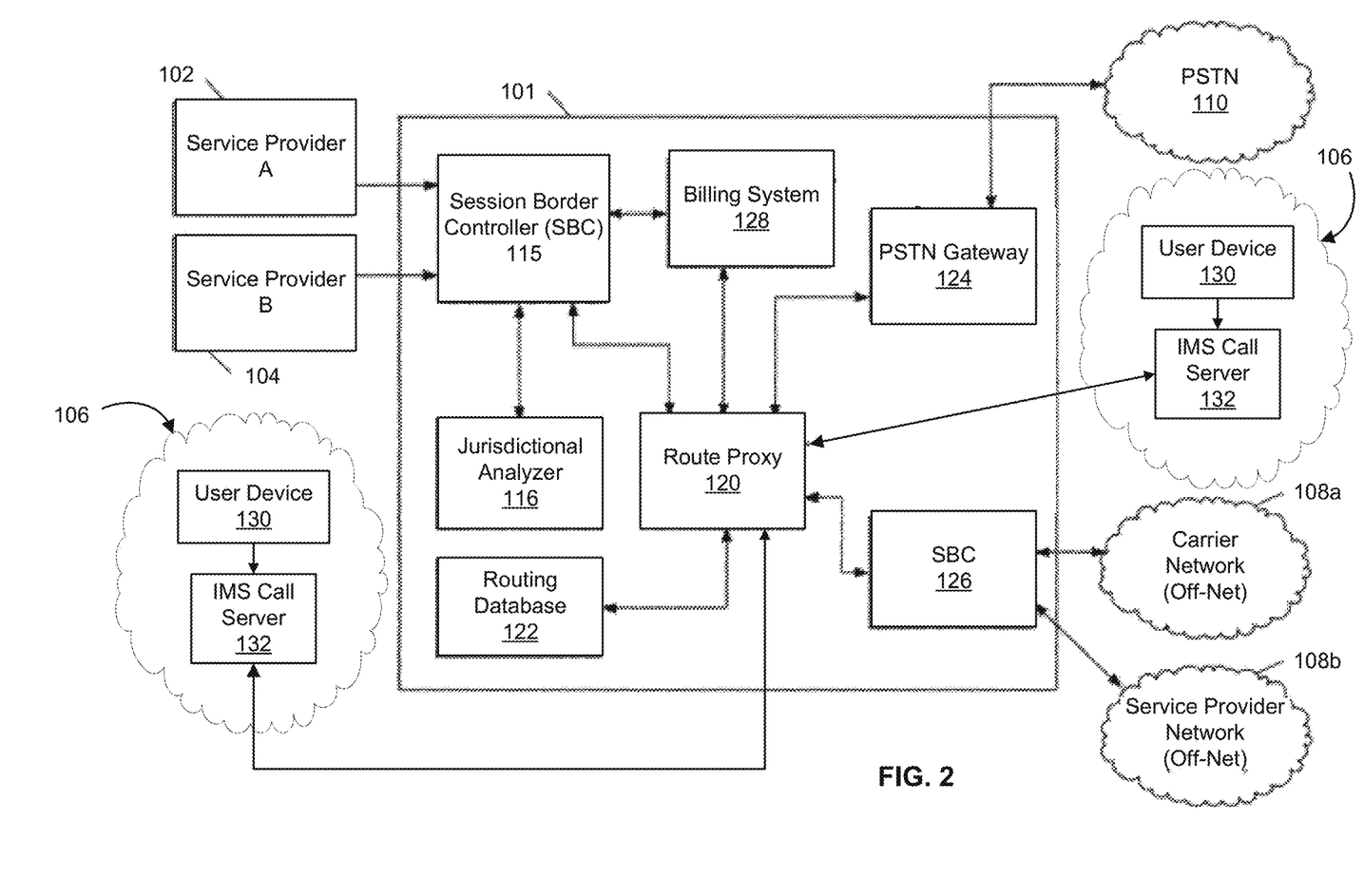
FIG. 2 is a block diagram of an example system and network.

FIG. 2 illustrates an example system configured to route calls. Specifically, FIG. 2 illustrates a system of the call routing facility 101 in FIG. 2. Referring to the system of FIG. 2, the call routing facility 101 may include a session border controller (SBC) 115, a jurisdictional analyzer 116, one or more route proxies (e.g., route proxy 120), a routing database 122, a billing system 128, and one or more interface devices (e.g., destination interface devices) such as a call management server (CMS), a PSTN gateway 124, a SBC 126, and/or universal gateway controller (UGC). As illustrated in FIG. 2, the components of the call routing facility 101 may communicate with each other and/or with other devices (e.g., PSTN 110, on-net network 106, off-net network 108a and 108b, service provider A 102, and service provider B 104). The devices of FIG. 2 may be configured to communicate using one or more Internet Protocol-based communication protocols, such as session initiation protocol (SIP) or extensible messaging and presence protocol (XMPP). The details of an example embodiment utilizing SIP will be discussed below.

Calls may originate from the on-net network 106. The call may originate from a user device 130 such as a network enabled device (e.g., PC, mobile phone, tablet, modem, gateway, etc.). As a further example, calls may be received via an Internet Protocol (IP) Multimedia Subsystem (IMS) 132 and may be transmitted (e.g., routed) to the route proxy 120 for further processing, as described herein below.

The SBC 115 may be configured to receive a call session (e.g., a call session initiation request), process the received request, transmit call information to a jurisdictional analyzer (e.g., jurisdictional analyzer 116), select a route proxy from the one or more route proxies of the call routing facility 101, transmit the request and/or other information about the call to the selected route proxy (e.g., route proxy 120), and/or interface with a billing system of the service provider (e.g., billing system 128). In some arrangements, the SBC 115 may operate in a Peering Point of Presence (POP), or the like.

The jurisdictional analyzer 116 may be configured to analyze call information, and/or transmit results of the analysis to an SBC (e.g., SBC 115). The jurisdictional analyzer 116 may provide for dynamic analysis of the call information. For example, the jurisdictional analyzer 116 may analyze for a call type based on an originating number of the call, a destination number of the call using dynamic mappings, rules and/or other information. The mappings, rules and/or other information of the jurisdictional analyzer may be based on the routing database (e.g., the definition of one or more rules and/or mappings is dependent on the organization of the routing database). In some embodiments, the jurisdictional analyzer 116 may operate as a SIP listener, or the like.

The route proxy 120 may be configured to create a query for a routing database, transmit the query to a routing database (e.g., routing database 122), analyze routing information received from the routing database, and/or forward information related to the call to a destination interface device (e.g., PSTN gateway 124, SBC 126, etc). Additionally, the route proxy 120 may be configured to interface with a billing system of the service provider (e.g., billing system 128). In some arrangements, the route proxy may operate as a SIP routing proxy.

The routing database 122 may be configured to receive a query, access information responsive to the query, and/or transmit routing information responsive to the query. The routing database 122 contains routing information, such as routing tables (e.g., least cost routing tables) and policies, that allows the routing proxy to proceed with routing the call to its destination. In one or more embodiments, the routing database 122 may be an intelligent routing database, such as an ENUM database.

The billing system 128 may be configured to receive information, such as a call detail record (CDR) and/or a call log, from an SBC (e.g., SBC 115), a routing proxy (e.g., route proxy 120), a CMS, and/or PSTN gateway 124 in order to perform billing mediation based on the call. In some arrangements, communications to/from the billing system 128 may use file transfer protocol (FTP).

Interface devices (e.g., destination interface devices) of the call routing facility 101 such as a call management server (CMS), PSTN gateway 124, universal gateway controller (UGC), SBC 126, etc., may be configured to receive and/or transmit information from a route proxy (e.g., route proxy 120), and/or interface with a downstream network to route the call.

For example, the interface devices may interface with devices of the PSTN 110, the on-net network 106, and the off-net network 108a and 108b in order to route the calls to/from the user devices. In one example, the SBC 126 may interface with devices of the on-net network 106 including the IMS 132, in order to route calls to downstream user devices. The IMS 132 may be configured to manage one or more services, and operations of the services, offered by the service provider over network 106. In another example, PSTN gateway 124 may interface with devices of the PSTN 110 including a PSTN gateway (not shown), which may be configured to process communications to and from a public switched telephone network 110. In another example, SBC 126 may interface with devices of off-net networks 108a and 108b, such as one or more communication gateways (not shown), which may be configured to process and manage communications over the third-party networks.

In some arrangements, the call routing facility 101 may be centrally located at a central office of the service provider (e.g., a single location). In other arrangements, the functions of the call routing facility 101 may be distributed throughout the network of the service provider. For example, the SBC 115 and the destination interface devices may be at different locations remote from each other. Additionally and/or alternatively, the one or more route proxies may be at different locations (e.g., first route proxy services destination interface devices at a first location, and second route proxy services destination interface devices at a second location, etc.). Additionally, in some embodiments, the call routing facility 101, or the distributed system implementing the functions of the call routing facility 101, may utilize a centralized routing database that contains the routing policies and/or routing tables. Each call routing process may utilize the centralized routing database to determine the routing information for the call (e.g., call session).

Figure 3:
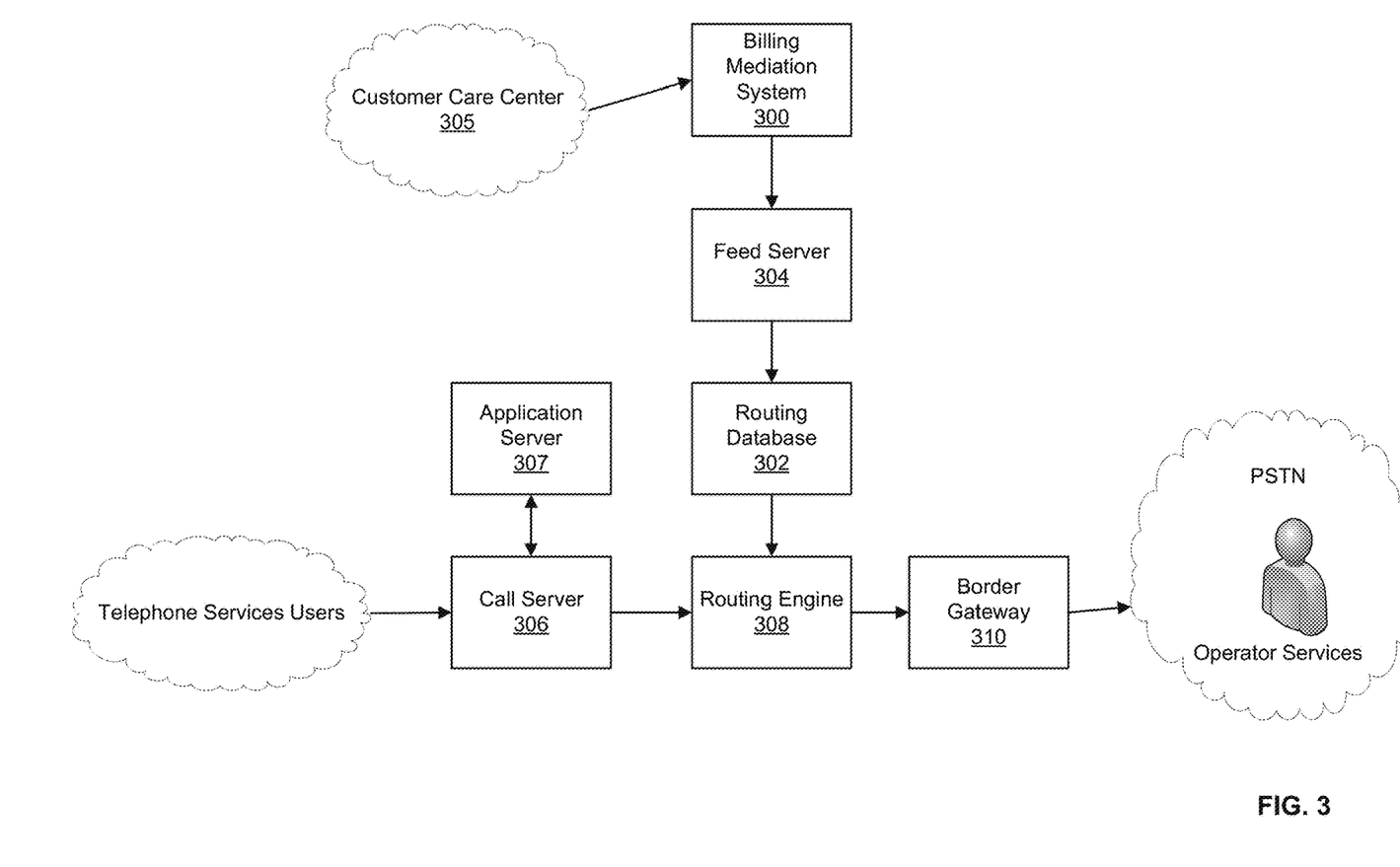
FIG. 3 is a block diagram of an example call processing.

As an illustrative example, FIG. 3 illustrates a data flow of methods that may be implemented in accordance with the present disclosure. As shown, a billing mediation system 300 (e.g., mediation server, billing system 128 (FIG. 2)) can be configured to populate/update a routing database 302 (e.g., routing database 122 (FIG. 2)) with a set of voice service users requiring accessibility. The routing database 302 can be updated in real time or may be periodic. The routing database 302 can be updated responsive to manual instruction or may be automatic. The billing mediation system 300 may be configured to interact with the routing database 302 directly or via a proxy or feed server 304. In an aspect, a customer care center 305 may receive an accessibility user's service order and may transmit the service order to the billing mediation system 300 for processing. As such, the information received from the customer care center may be used to update the routing database 302 via one or more of the billing mediation system 300 and the feed server 304.

In operation, a user such as an accessibility user requests a service such as an operator service by dialing "0," or using directory assistance, or other numbers or triggers that may be configured to request operator services. Operator services may be any assistance service and may include human assistance or automated assistance. A call server 306 authenticates the request (e.g., call) from the user (e.g., via a application server 307) and may establish a call session, for example, via the application using a protocol such as SIP. Once the call session is established, the call server 306 can transmit call information to a routing engine 308 for call routing.

The routing engine 308 can be configured to determine that the call is an operator service call from the dialed number, such as "0" or other numbers and sequences. From the received information, the routing engine 308 can retrieve the source address (e.g., calling number, source identifier, etc.) and can query the routing database using the source address. As an example, the routing database 302 can be queried using the source address as the key. Such a query is different from a conventional query using a destination address or called number as a query key. The routing database 302 can generate a response for the routing query based on the routing table for operator service. This routing table can comprise the accessibility user phone numbers and the corresponding routing information, which may include a destination address (e.g., called number) associated with a human operator. The routing table may also include other routing information for non-accessibility users and their associated source addresses. The routing engine 308 can receive the response to the query and can route the call to an appropriate destination address, as indicated by the query response. As an example, the call may be routed to a border gateway 310, which can then route the call to the destination address.

Figure 4:
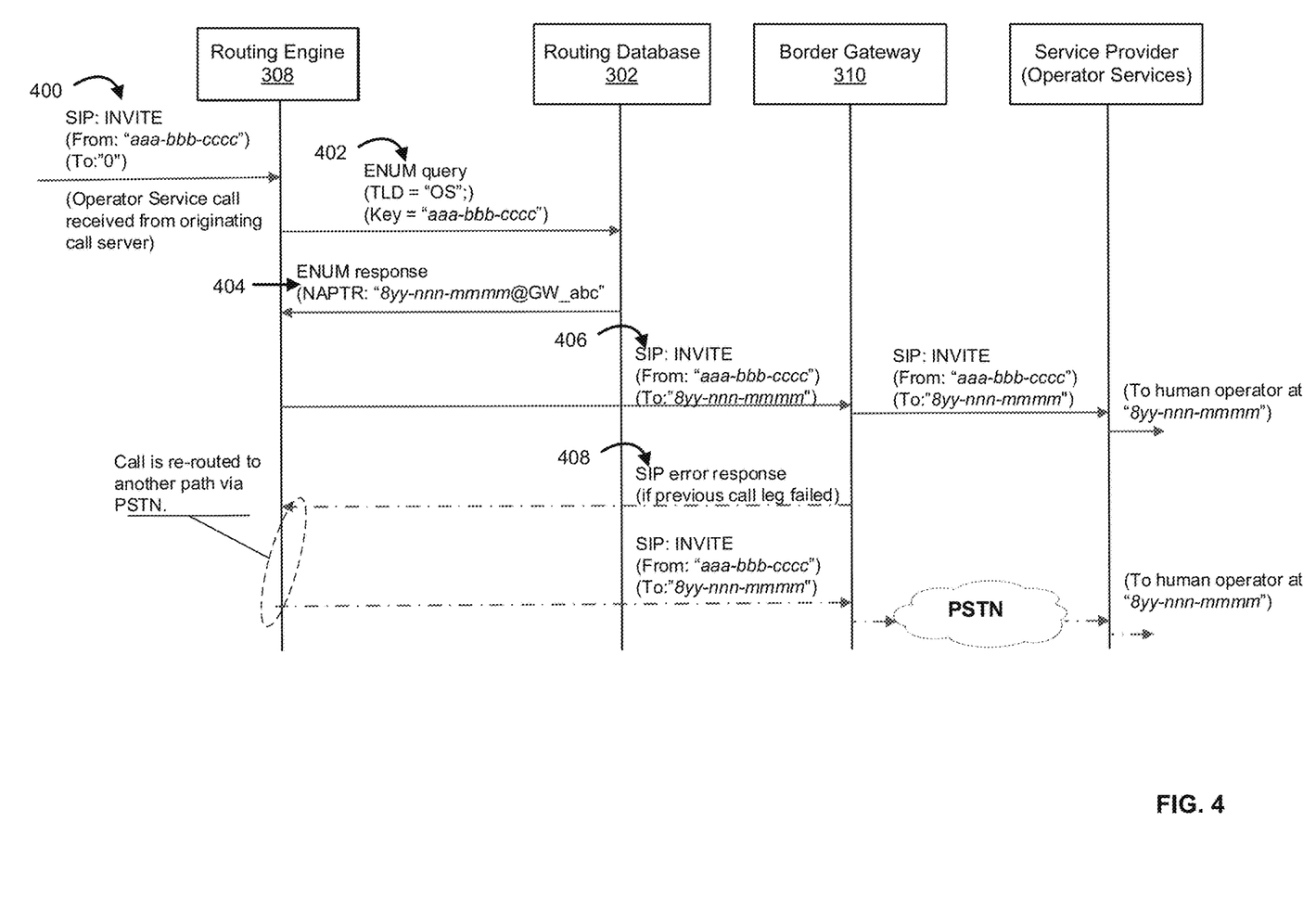
FIG. 4 is a block diagram of an example call processing.

FIG. 4 illustrates an example implementation of the data flow of FIG. 3, using the SIP protocol. As illustrated, a call 400 (e.g., INVITE message) can be received at the routing engine 308 from an originating call server (e.g., call server 306 (FIG. 3)). As an example, the call 400 may have a SIP format such as: SIP: INVITE(From: "aaa-bbb-cccc")(To: "0") or SIP: INVITE(From: "User_1")(To: "0"), wherein the call 400 indicates the source (e.g., aaa-bbb-cccc, User_1, etc.) of the call 400 and a destination of the call 400. The source of the call 400 may be indicated as a calling number or identifier. The destination of the call 400 may be indicated as a called number or identifier. Other indicators may be used.

The routing engine 308 can query the routing database 302 to determine routing information, for example. The routing engine 308 can query the routing database 302 using a query message 402 such as: ENUM query(TLD="OS";) (Key="aaa-bbb-cccc"), where the key of the identifier of the source of the call 400 is used as the key (e.g., e.g., aaa-bbb-cccc, User_1, etc.) in the database query. As such, the routing database 302 or computing device in communication with the routing database 302 may provide a response message 404 is the form of: ENUM response(NAPTR: "8yy-nnn-mmmm@GW_abc") indicating the routing information, for example, as a name authority pointer (NAPTR) indicating a routing path or destination. Other pointers and routing information can be included in the response message 404 to direct the further processing of the call 400.

The routing database 302 can comprise a table such as an operator services table that has been populated (e.g., provisioned, updated, etc.) with key-value pairs. As another example, the key-value pairs can comprise routing information (e.g., destination address, service address, etc.) and a plurality of user addresses (e.g., source addresses). Table 1 illustrates an example table of such key-value pairs. Such a table may be populated via a customer care center and/or via one or more of a mediation server and a feed server. Other mechanisms may be used to associate source addresses with customized routing information.

TABLE 1

| Key | Routing Information |
| --- | --- |
| "aaa-bbb-cccc" | 1234 |
| "User_1" | 1234 |
| "User_2" | 1234 |
| "User_n" | 1234 |
| "0" | 6789 |
| "1" | 6789 |
| "n" | 6789 |

As a further example, the routing information may then be used to retrieve NAPTR routing information such as via a query to a NAPTR mapping table, which may be stored in the routing database 302. As example, NAPTR routing table is illustrated in Table 2.

TABLE 2

| Key | NAPTR |
| --- | --- |
| "1234" | SIP: "tollfree_TN"@GW1_xyz (primary)<br>SIP: "tollfree_TN"@GW2_xyz (failover) |
| "6789" | SIP: "original_called"@GW1_xyz (primary)<br>SIP: "original_called"@GW2_xyz (failover) |

The routing engine 308 may transmit a message 406 to the border gateway 310 in the form of: SIP: INVITE(From: "aaa-bbb-cccc")(To: "8yy-nnn-mmmm"), which may be transmitted by the border gateway 310 to a service provider using a similar format: SIP: INVITE(From: "aaa-bbb-cccc") (To: "8yy-nnn-mmmm") and may be further routed to the destination address (e.g., service address) using the example format: (To human operator at "8yy-nnn-mmmm"). As illustrated, the message 406 may indicate the source of the call 400, but may include the routing information as an updated destination. As such, a source of the call 400 may dial a destination, but may be re-routed by the described systems and methods to a customized destination, such as a human operator, automated operator, or accessibility services.

It is understood that the messaging illustrated in FIG. 4 is an example implementation and other messages and protocols may be used. In certain aspects, if an error occurs, a SIP error response 408 may be transmitted to the routing engine 308 for further processing. As such, the call (e.g., messaging) may be re-routed to another path, for example, using the failover NAPTR shown in Table 2.

As an illustrative example, a user may dial "0" or some other number associated with a particular service from a device or location associated with a source address (e.g., identifier). From the user's perspective, the call is connected to the desired service (e.g., accessibility service) and the call commences. However, the network component(s) processing the call to establish the call between the user and the destination may not be connecting the user to a default destination associated with the dialed "0." Instead, since the user is calling from a device or location associated with a source address, the network component(s) may re-route the call to a customized service destination based on the known source address. As an example, the source address may be mapped to a service destination address by a billing system or customer care system such that calls originating from the source address can be routed in a custom manner.

As another illustrative example, a user may dial a predetermined sequence of numbers associated with a particular service from a device or location associated with a source address (e.g., identifier). From the user's perspective, the call is connected to the desired service (e.g., accessibility service) and the call commences. However, the network component(s) processing the call to establish the call between the user and the destination may connect the caller with an intervening service such as an assistance service (e.g., accessibility service). Since the user is calling from a device or location associated with a known source address, the network component(s) may re-route the call to a customized service destination based on the known source address. As an example, the source address may be mapped to a service destination address by a billing system or customer care system such that calls originating from the source address can be routed in a custom manner. As such, calls originating from the known source address may be automatically routed to include an assistance feature (e.g., accessibility, operator, hearing-impaired, etc.) for the call.

Figure 5:
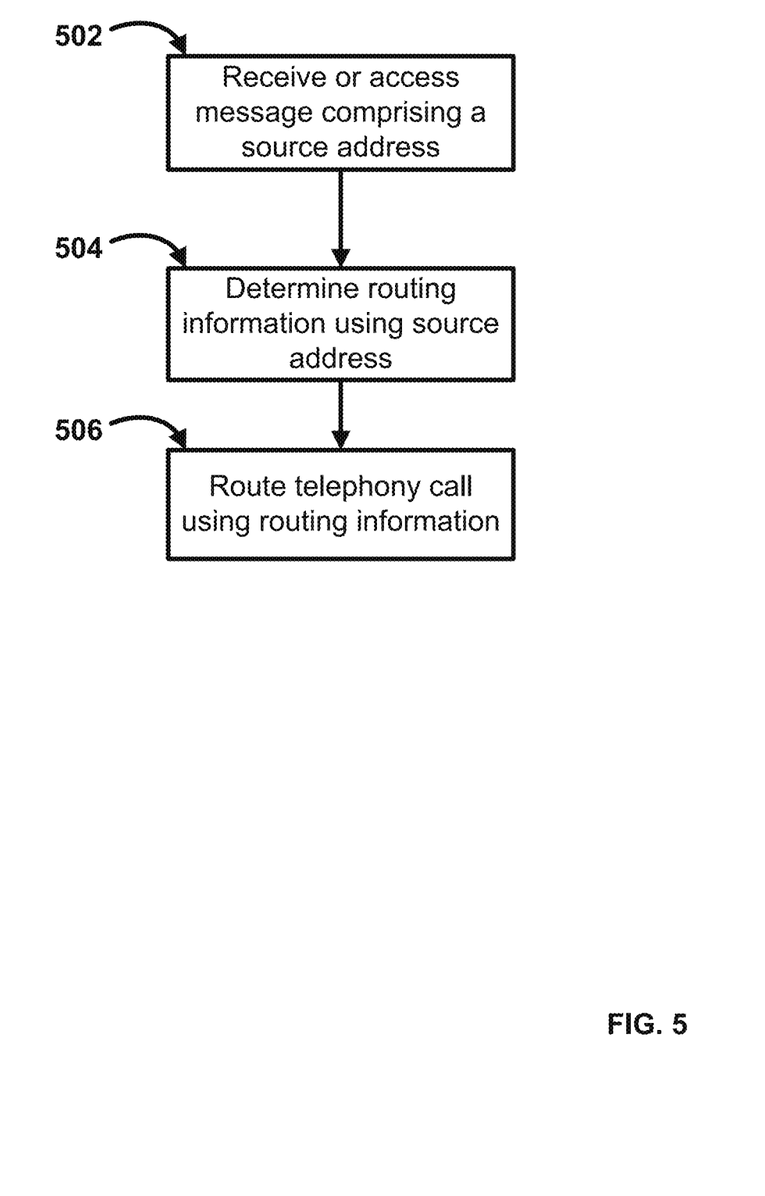
FIG. 5 is a flow chart of an example method.

FIG. 5 illustrates operating procedures that can be used to route network information such as telephony calls. At step or operation 502, and referring to FIG. 3 and FIG. 5, a message such as a telephony message (e.g., SIP message) can be received or accessed by a computing device such as a routing engine (e.g., routing engine 308). The telephony message can comprise a source address and a destination address such as a dialed number. A user such as an accessibility user may dial "0" to request operator services. As such, a message such as a request for operator service can be transmitted to and received by a call server (e.g., call server 306). The call server 306 can then transmit call information to a routing engine 308 for call routing. The routing engine 308 can be configured to determine that the call is an operator service call based on the dialed number "0."

At step or operation 504, and referring to FIG. 3 and FIG. 5, routing information can be determined, for example, using the source address. The routing engine 308 can retrieve the source address (e.g., calling number) and can query a database (e.g., routing database 302) using the source address. As an example, the routing database 302 can be queried using the source address as the key. Such a query is different from a conventional query using a destination address or called number as a query key. The routing database 302 can generate a response for the routing query based on the routing table for operator service. This routing table can comprise the accessibility user phone numbers and the corresponding routing information, which may include a destination address (e.g., called number) associated with a human operator. The routing table may also include other routing information for non-accessibility users and their associated source addresses.

At step or operation 506, and referring to FIG. 3 and FIG. 5, a telephony call can be routed using at least the determined routing information of step or operation 504. For example, the routing engine 308 can receive the response to the query and can route the call to an appropriate destination address, as indicated by the query response. As an example, the call may be routed to a border gateway 310, which can then route the call to the destination address.

Figure 6:
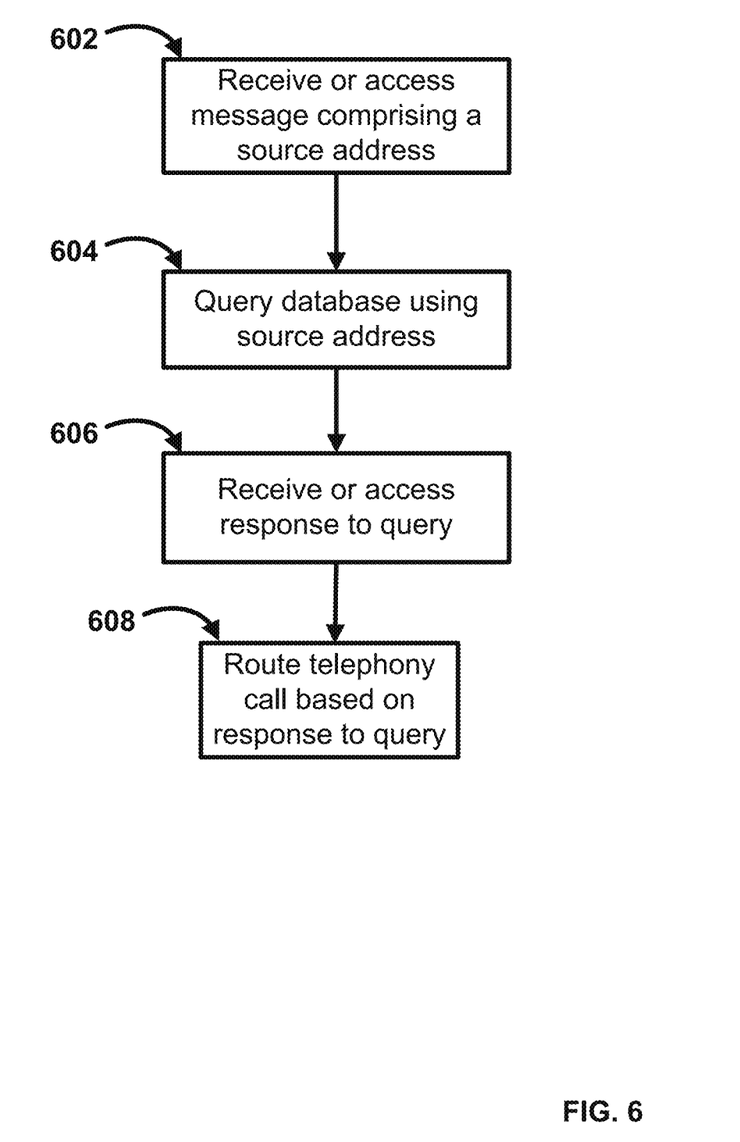
FIG. 6 is a flow chart of an example method.

FIG. 6 illustrates operating procedures that can be used to route network information such as telephony calls. At step or operation 602, and referring to FIG. 3 and FIG. 6, message such as a telephony message (e.g., SIP message) can be received or accessed by a computing device such as a routing engine (e.g., routing engine 308). The telephony message can comprise a source address and a destination address such as a dialed number. The telephony message can comprise an indication of a request for operator services such as accessibility services. For example, a user such as an accessibility user may dial "0" to request operator services. As such, a message such as a request for operator service can be transmitted to and received by a call server (e.g., call server 306). The call server 306 can then transmit call information to a routing engine 308 for call routing. The routing engine 308 can be configured to determine that the call is an operator service call based on the dialed number "0."

At step or operation 604, and referring to FIG. 3 and FIG. 6, a database can be queried using the source address. As a further example, the routing engine 308 can retrieve the source address (e.g., calling number) and can query a database (e.g., routing database 302) using the source address. As an example, the routing database 302 can be queried using the source address as the key. Such a query is different from a conventional query using a destination address or called number as a query key.

At step or operation 606, and referring to FIG. 3 and FIG. 6, a response to the querying the database can be received or accessed. As an example, the response comprises routing information associated with the source address. As a further example, the routing information can comprise a destination address associated with one or more operator services. In certain aspects, the routing database 302 can generate a response for the routing query based on the routing table for operator service. This routing table can comprise the accessibility user phone numbers and the corresponding routing information, which may include a destination address (e.g., called number) associated with a human operator. The routing table may also include other routing information for non-accessibility users and their associated source addresses.

At step or operation 608, and referring to FIG. 3 and FIG. 6, a telephony call can be routed using at least the determined routing information of step or operation 504. For example, the routing engine 308 can receive the response to the query and can route the call to an appropriate destination address, as indicated by the query response. As an example, the call may be routed to a border gateway 310, which can then route the call to the destination address.

Figure 7:
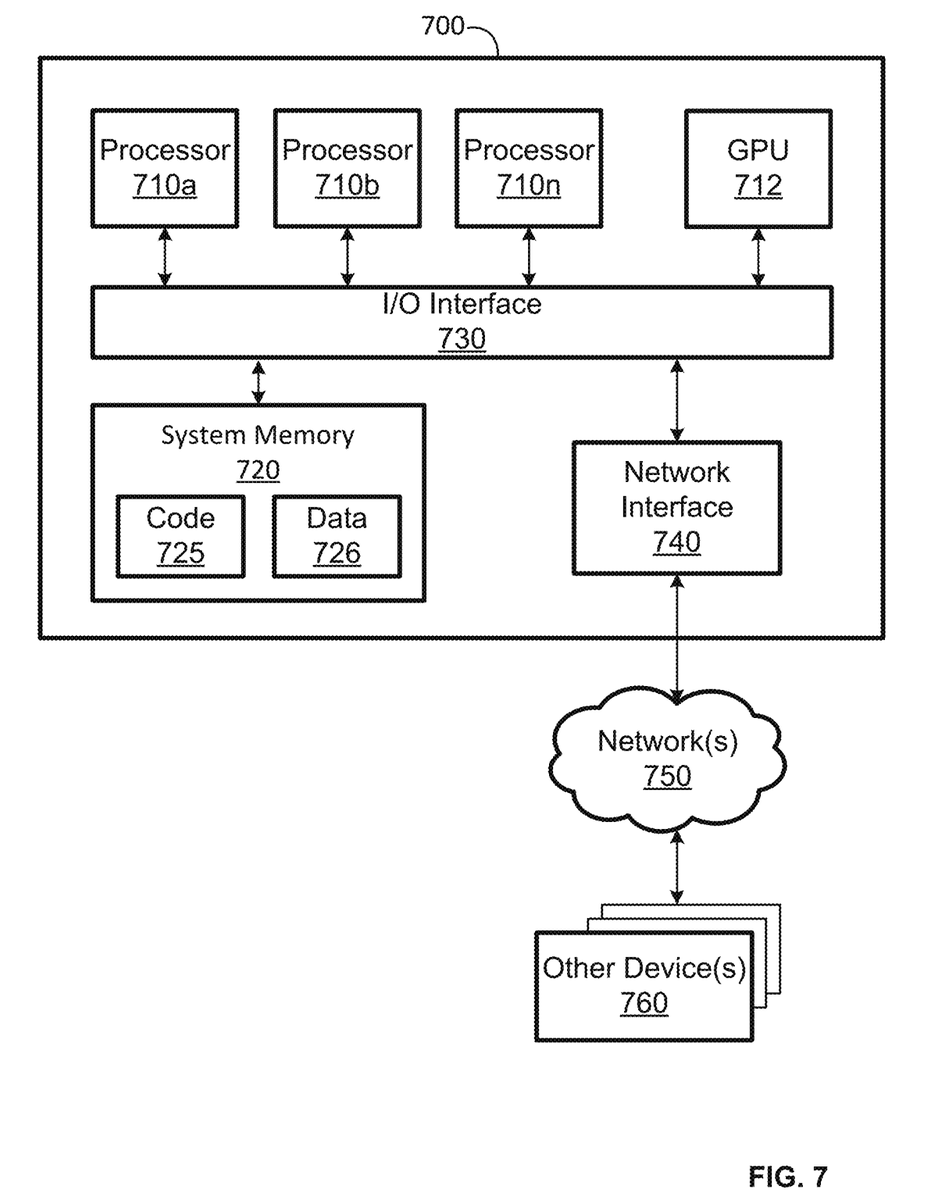
FIG. 7 is a block diagram of an example computing device.

FIG. 7 depicts a general-purpose computer system that includes or is configured to access one or more computer-accessible media. In the illustrated embodiment, computing device 700 includes one or more processors 710*a*, 710*b*, and/or 710*n* (which may be referred herein singularly as a processor 710 or in the plural as the processors 710) coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processor(s) 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 710. In various embodiments, system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques and data described above, are shown stored within system memory 720 as code 725 and data 726.

In one embodiment, I/O interface 730 may be configured to coordinate I/O traffic between processor(s) 710, system memory 720 and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 620, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes or computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on), and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may comprise any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving, by a computing device, a telephony call having a source address associated with a first user, at least one service request associated with the telephony call, and a destination address associated with a second user;
   determining, based on comparing the source address to one or more mapped addresses of a plurality of mapped addresses, a mapped address associated with one or more alternative services; and
   routing, based on the determined mapped address and the at least one service request, the telephony call to the one or more alternative services instead of to the destination address associated with the second user.

2. The method of claim 1, wherein the receiving the telephony call comprises receiving, using a session initiation protocol, a telephony message.

3. The method of claim 1, wherein the source address comprises a calling telephone number.

4. The method of claim 1, wherein the plurality of mapped addresses comprises key value pairs of a plurality of re-routing addresses and a plurality of user addresses, and wherein the determining the mapped address associated with the one or more alternative services comprises querying the plurality of mapped addresses using one of the plurality of user addresses as a query key.

5. The method of claim 1, wherein the plurality of mapped addresses is caused to update by a customer care center and via one or more of a mediation server and a feed server.

6. A method comprising:
   receiving, by a computing device, a telephony message having a source address associated with a first user, at least one service request associated with the telephony message, and a destination address associated with a second user;
   determining, based on matching the source address to at least one of a plurality of user addresses, routing information to an alternative service, wherein each of the plurality of user addresses is mapped to at least one of a plurality of destination addresses associated with one or more alternative services; and
   routing, based at least in part on the at least one service request, a telephony call using the determined routing information, wherein the telephony call is routed to at least the alternative service instead of to the destination address associated with the second user.

7. The method of claim 6, wherein the receiving the telephony message comprises receiving, using a session initiation protocol, the telephony message.

8. The method of claim 6, wherein the source address comprises a telephone number.

9. The method of claim 6, wherein the determined routing information comprises one of the plurality of destination addresses.

10. A method comprising:
    receiving, by a computing device, a first network message having a source address associated with a first user, at least one service request associated with the first network message, and a destination address associated with a second user;
    determining, based on matching the source address to at least one of a plurality of mapped addresses, an alternative service address associated with an alternative service; and
    sending, based at least in part on the at least one service request associated with the first network message, a second network message using at least the alternative service address instead of the destination address associated with the second user.

11. The method of claim 10, wherein the receiving the first network message comprises receiving, using a session initiation protocol, a telephony message.

12. The method of claim 10, wherein the determining the alternative service address comprises querying, using the source address as a query key, a database comprising key value pairs of routing information and the plurality of mapped addresses.

13. The method of claim 1, wherein the determining the mapped address associated with the one or more alternative services comprises querying the plurality of mapped addresses using a session initiation protocol.

14. The method of claim 1, wherein the plurality of mapped addresses comprises an indication to route telephony calls associated with the source address to the one or more alternative services.

15. The method of claim 6, wherein the destination address comprises a dialed number.

16. The method of claim 6, wherein the alternative service comprises a telephony accessibility service.

17. The method of claim 6, wherein the routing the telephony call comprises re-routing the telephony call from the at least one of the plurality of destination addresses to at least the alternative service.

18. The method of claim 10, wherein the plurality of mapped addresses further comprises a routing table comprising a plurality of source addresses and a plurality of destination addresses.

19. The method of claim 10, wherein the plurality of mapped addresses comprises an indication to route telephony calls associated with each of a plurality of source addresses to one of a plurality of telephony call accessibility service addresses.

20. The method of claim 1, wherein the one or more alternative services comprise one or more telephony assistance services.

\* \* \* \* \*